United States Patent [19]

Balson

[11] Patent Number: 5,078,099
[45] Date of Patent: Jan. 7, 1992

[54] DISPOSABLE LITTER BOX WITH COLLAPSIBLE CORNERS TO MAINTAIN THE BOX IN AN OPEN POSITION

[76] Inventor: John E. Balson, 227 Lancaster Ave., Devon, Pa. 19333

[21] Appl. No.: 574,743

[22] Filed: Aug. 30, 1990

Related U.S. Application Data

[63] Continuation-in-part of Ser. No. 414,295, Sep. 29, 1989, abandoned.

[51] Int. Cl.$^5$ .............................................. A01K 29/00
[52] U.S. Cl. ...................................... 119/168; 229/125
[58] Field of Search ................. 119/168, 165; 229/138, 229/139, 125, 101

[56] References Cited

U.S. PATENT DOCUMENTS

| | | | |
|---|---|---|---|
| 657,197 | 9/1900 | Hills | 229/101 |
| 2,307,913 | 1/1943 | Berstein | 229/139 |
| 2,917,221 | 12/1959 | Risdon | 229/125 |
| 3,581,977 | 6/1971 | Kirsky et al. | 119/168 |
| 3,801,001 | 4/1974 | Taylor | 229/139 |
| 4,014,292 | 3/1977 | Coughlin et al. | 119/168 |
| 4,164,314 | 8/1979 | Edgar | 119/165 |
| 4,628,863 | 12/1986 | Eichenauer | 119/168 |
| 4,739,725 | 4/1988 | Fennelly | 119/168 |
| 4,782,788 | 11/1988 | Arcand | 119/168 |

FOREIGN PATENT DOCUMENTS 2608012  6/1988  France .................................. 119/168

Primary Examiner—Robert P. Swiatek
Assistant Examiner—Todd E. Manahan
Attorney, Agent, or Firm—Eugene E. Renz, Jr.

[57] ABSTRACT

A disposable device for use as a litter box comprising a blank made of disposable flat material scored and cut in a predetermined pattern to form a receptacle section. The receptacle section has a generally rectangular base and upstanding opposing side walls and end walls and a top closure section including at least two opposing end panels pivotally connected to opposing end walls of the base. The receptacle section is actuatable between a closed position overlying the base, and an open position wherein the side and end panels are upright permitting access to the receptacle section. The corners at the juncture of the side and end panels form foldable portions which are collapsible to pivot inwardly and thereby maintain and lock the side and end panels in an upright, open position.

5 Claims, 3 Drawing Sheets

DISPOSABLE LITTER BOX WITH COLLAPSIBLE CORNERS TO MAINTAIN THE BOX IN AN OPEN POSITION

This is a Continuation-in-Part of copending application Ser. No. 07/414,295, filed on Sept. 29, 1989 now abandoned.

FIELD OF THE INVENTION

The present invention relates to a ready to use, disposable feline litter box.

BACKGROUND OF THE INVENTION

Members of the cat family, both purebred or registered, and of the common or alley cat variety, are one of the most popular house pets. Without attempting to debate the relative merits of various pets, including cats, it is clear that one particular advantage that cats have over other pets, such as dogs, is that cats are capable of being house broken on an unsupervised basis. All that is necessary is that "kitty litter" be provided in a receptacle for the cat in a routine and regular place which affords a minor degree of privacy for the cat. Then, if this litter is confined and changed or cleaned regularly, the cat, and presumably the owners, are happy.

It is clear that one of the major difficulties with this otherwise ideal situation is that the litter box must be cleaned from time to time. Human nature as it is, the longer that one puts off this unpleasant task, the more unpleasant the task becomes. In any event, cleaning a used kitty litter box on a regular and routine basis represents one of the more negative aspects of cat ownership. Cat waste can transmit diseases such as Toxoplasmosis which poses a significant risk to pregnant women. Avoiding these drawbacks is, of course, highly desirable.

At the present time there is nothing on the market which would solve all of the problems involved with cat litter box concerns. Litter boxes are available in various shapes and sizes, ranging from plastic dish pans to artistically designed structures. The actual litter used in litter boxes varies considerably, and many products are available in supermarkets and other commercial establishments. It becomes necessary to keep a supply of litter, to clean the litter box, and to dispose of the used litter.

Accordingly, it is a object of this invention to provide a product which obviates many of the deficiencies of the present system for indoor sanitation for feline pets.

It is another object of this invention to provide a device which eliminates the necessity of having to clean the litter box.

Yet another object of this invention is to provide a device which permits disposal of used litter without requiring the pet owner to come in contact with the contaminated litter.

A still further object of the present invention is to provide a novel arrangement wherein foldable portions of at least one side panel and the adjacent end panels are pushed inwardly towards the interior of the device to lock the top closure panels in an open, erect position during use and which can be easily manipulated to permit reclosing the litter box when it is desired to dispose of the box and contents.

Other objects will appear hereinafter.

SUMMARY OF THE INVENTION

It has now been discovered that the above and other objects of the present invention may be accomplished in the following manner. Specifically, a new disposable device for use as a feline litter box has been discovered. The device includes a disposable flat material such as cardboard which has been cut into a pattern to form a receptacle section and a top closure section. The receptacle section includes a base and receptacle forming walls which are of a height such that they may be raised sufficiently from the base to enclose a quantity of particulate matter such as kitty litter. The top closure section includes at least two opposing top closure panels which extend up from the opposing walls of the receptacle section and are scored or creased at that junction. The top closure panels can thereby move from a vertical, or in use position, to a horizontal, or closed position.

Preferably, the receptacle section is rectangular in shape with opposing side walls and end walls which form an open box section, and the top closure portion includes a pair of side panels which are aligned with the length of the base contiguous with the side walls, and a pair of end panels which are aligned with the width of the base contiguous with the end walls. In a preferred embodiment, the side panels are cooperatively attached to the end panels so that, with the addition of score lines, the end panels fold inwardly over the open box section and thereby cause the side panels to fold in over the open box section to form a sealed container which will not spill the particulate material in the litter box.

In the preferred embodiment, the end panels are each provided with an arcuate shaped opening through which the cat may enter and exit the litter box. The side panels and the end panel portions adjacent to the side panels extend upward for a sufficient distance to provide the type of privacy conditions that cats tend to prefer. Foldable portions of at least one side panel and the adjacent end panels are formed at the junctures of the side panel and adjacent end panels which can be pushed inwardly towards the interior of the litterbox to lock the top closure panels in an open, erect position during use of the device.

In the preferred embodiment, the top closure portion includes a means for resealing the device, such as a tab and slot arrangement, so that the product is easy to dispose of. The side panels and end panels are returned to the horizontal closed position, the tab is inserted into the slot, and the entire device is carried to the trash.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
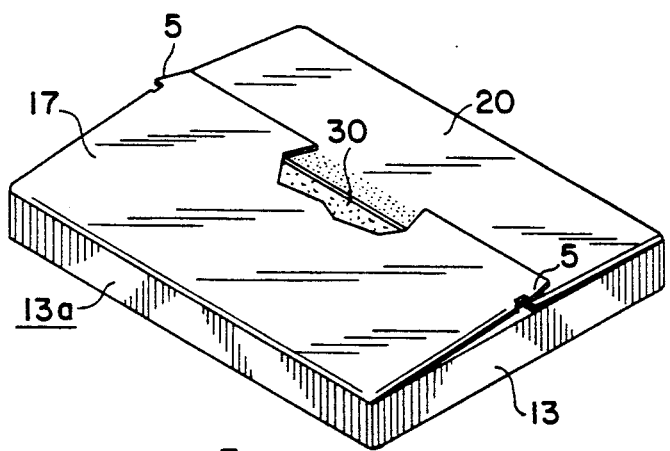
FIG. 1 is a perspective view of a litter box made in accordance with the present invention in the closed position as a finished product prior to use.
Figure 2:
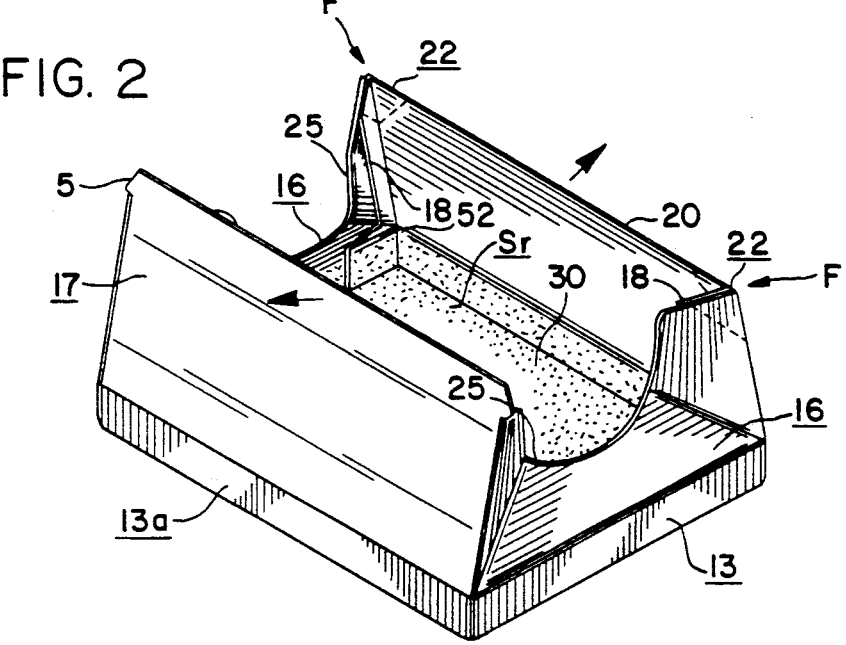
FIG. 2 is a perspective view showing the litter box of FIG. 1 in a partially opened position.
Figure 3:
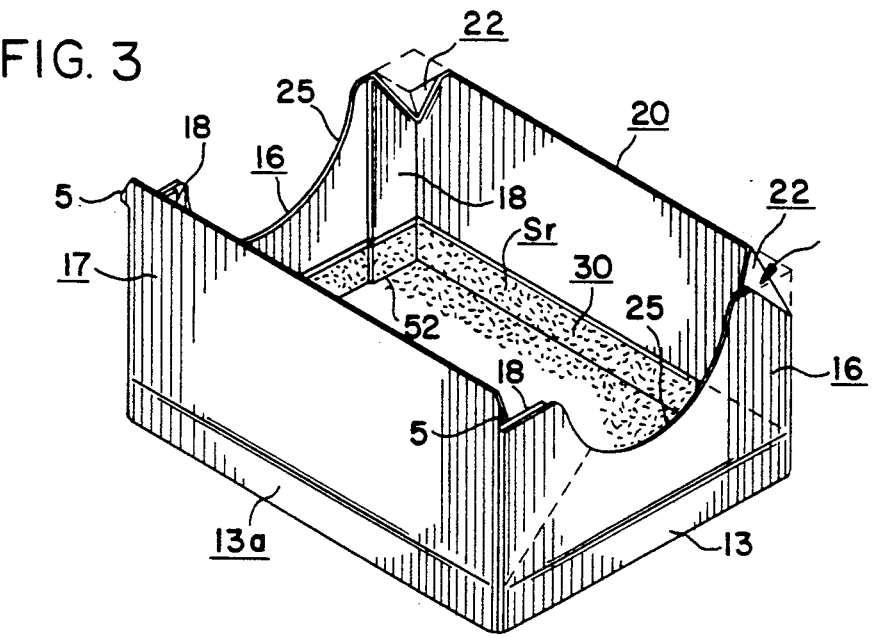
FIG. 3 is a perspective view of the litter box of FIGS. 1 and 2 with the foldable portions of the side panel and adjacent end panels bent inwardly to lock and maintain the top closure side panels and top closure end panels in an open, fully erected position ready for use.

Referring now to the drawings and particularly to FIGS. 1-3 thereof, there is shown a litter box made in accordance with the present invention. The litter box material is preferably disposable. Cardboard is a suitable material since it can be cut and scored from a flat sheet of material to form the finished box in a manner described in more detail below. It is noted that even though the panels 16, 17, 20 and walls 13, 13a are shown blank, printed matter in the form of instructions, advertisements, decorations and the like may be applied to the commercial form of the litter box. Additionally, when multiple ply cardboard is used, the more absorbent layer is preferred for the inside layer.

Figure 4:
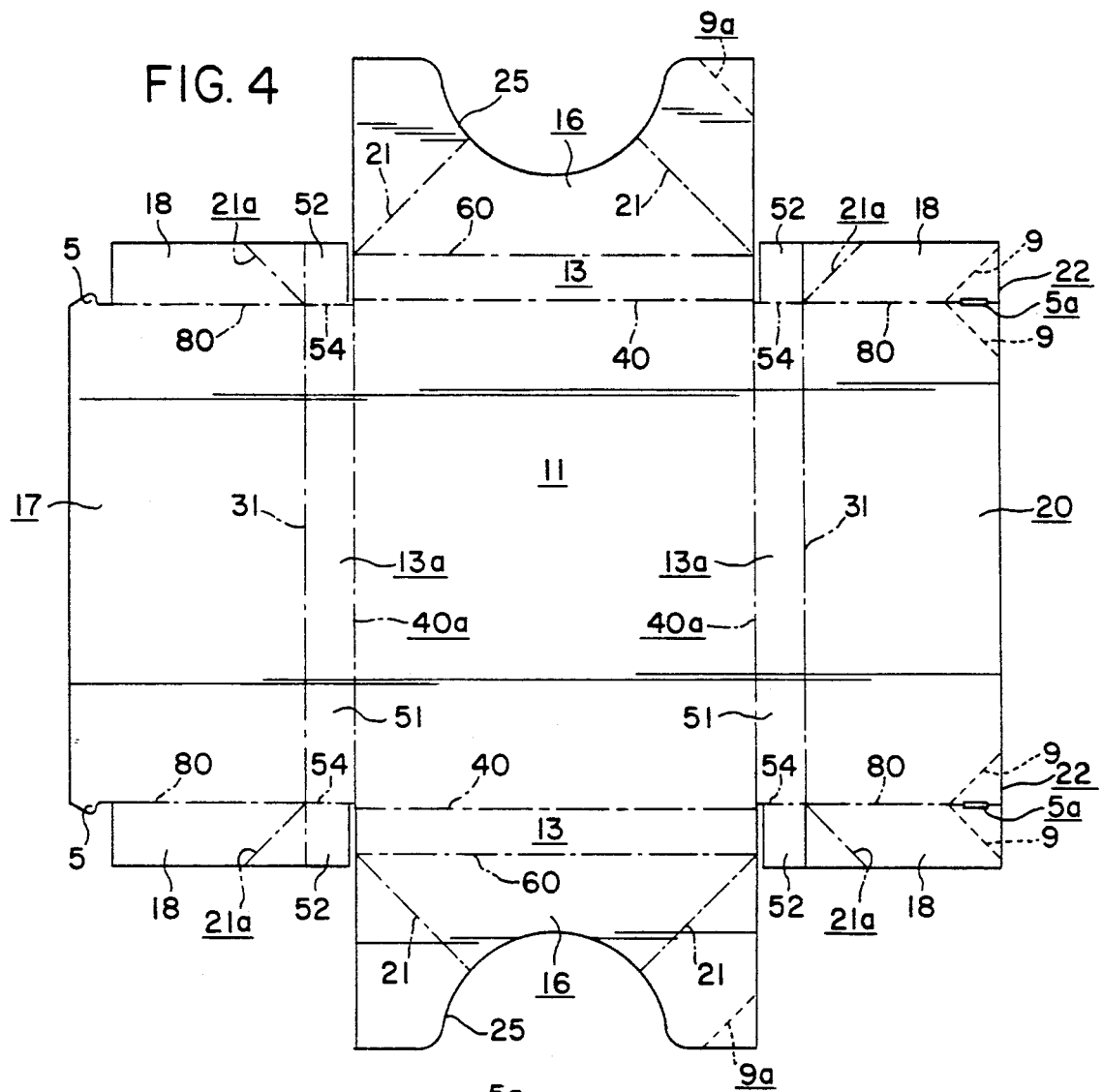
FIG. 4 is a plan view of a disposable, flat material scored and cut in a predetermined pattern to form a litter box in accordance with the present invention.

The litter box may be formed from a disposable flat material of the configuration shown in FIG. 4 which is scored and cut to form base 11 and the walls 13, 13a comprising the receptacle section and the panels 16, 17, 20 comprising the top closure section. The litter box as best illustrated in FIGS. 1-3 broadly comprises a receptacle section to hold a quantity of litter 30 and a top closure section including side panels 17, 20 and end panels 16 which fold and interleaf with one another and are actuatable between a closed position (FIG. 1) and a fully opened position (FIG. 3).

Considering now more specifically the structural details and arrangement of the litter box as shown in FIG. 4, a blank made of disposable flat material is cut and scored such that the receptacle section comprises the rectangular base 11 with contiguous opposing sets of side walls 13a and end walls 13. The base 11 and side walls 13a and end walls 13 are separated by scoring 40a, 40 respectively which permits the pivoting of the side walls 13a and end walls 13 vertically at the scoring 40a, 40 respectively, to form an open box configuration (see FIG. 5). The width of the side walls 13a and end walls 13 are such that the open box configuration can contain at least the predetermined amount of kitty litter 30, or other material, within the receptacle section. A sheet (not shown) containing advertising instructions, or decoration can be placed over the contents 30, such as kitty litter, to prevent particulate matter from spilling out when the closure section is activated to an open position.

Figure 5:
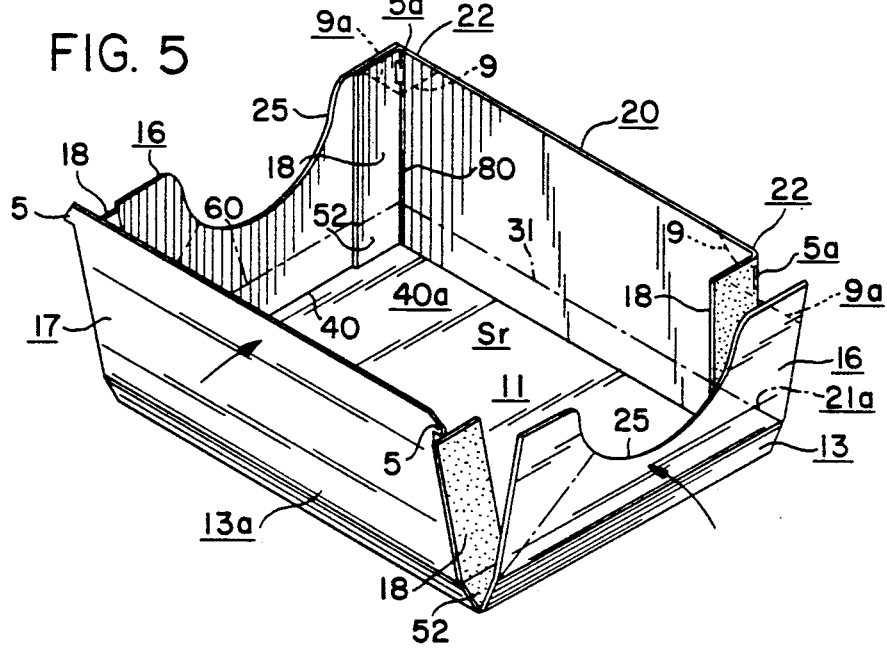
FIG. 5 is a perspective view showing folding and joining of the walls and panels to form the litter box of the present invention.

The opposing set of side walls 13a are mirror images of each other and such side walls 13a comprise a center section 51 and a glue tab 52 at each end with fold lines 54 at the junction of center section 51 and glue tab section 52. Center section 51 is centered upon, and is both contiguous and continuous with the base 11, except that the length of center section 51 may be equal to the length of the base 11 minus twice the thickness of the material used, for example cardboard, in the construction of the litter box. The length of the center section 51 is such that upon assembly of the litter box as shown in FIG. 5, the end walls 13 and end panels 16 may pivot vertically freely as shown in FIG. 5 to mate with the glue tab 52 and glue tab sections 18 without interference from the side walls 13a, thus forming straight, approximately 90° corners about the junctions between the side walls 13a and side panels 17, 20 with the end walls 13 and end panels 16.

The closure section comprises two opposing side panels 17, 20 and two opposing end panels 16. The two opposing end panels 16 are mirror images of each other and are of a generally rectangular shape with an arcuate shaped opening 25 distal to the receptacle section as shown in FIG. 4.

The end panels 16 are contiguous and continuous with the end walls 13 of the receptacle section and fold lines 60 exist at the junction between the respective end panels 16 and end walls 13 to enable closure of the litter box upon assembly, opening for use, and then reclosure for discarding the used litter box as shown in FIGS. 1, 2, 6 and 7. The diagonal fold lines 21 radiating from the left and right side, respectively, of the arcuate opening 25 and terminating at the junction of the left and right edges, respectively, of the end panels 16 and the fold lines 60, also allows for the closure and reclosure of the litter box as shown in FIGS. 1, 2, 6 and 7. Diagonal scoring 9a exists on the end panels 16 at the upper corners on the edges proximate to side panel 20. When the litter box is assembled, as shown in FIG. 5, the scoring 9a overlaps the portion of the scoring 9 on the glue tab 18 of side panel 20, so that the foldable portions 22 of the side panel 20 and adjacent end panels 16 may be easily pushed inwardly toward the interior of the litterbox to lock the top closure panels 16, 17, 20 in an open, erect position as shown in FIGS. 2 and 3.

Side panel 20 is contiguous and continuous with side wall 13a on the side adjacent to the scoring 9a on the end panels 16 and fold lines 31 exist at the junction between the side wall 13a and side panel 20 to enable closure of the litter box upon assembly, opening for use, and then reclosure for discarding the used litter box as shown in FIGS. 1, 2, 6 and 7. Side panel 20 also comprises vertical glue tab panels 18 on either side which are generally rectangular in shape. At the junction of the glue tab panels 18 with the rest of side panel 20 are fold lines 80 which allow for the assembly of the litter box as shown in FIG. 5. Upon assembly the glue tab panels 18 are pivoted inwardly at fold lines 80 allowing the mating by gluing of glue tab panels 18 with the portion of the end panels 16 as shown in FIG. 5. Radiating outwardly from the junction of fold lines 31 and fold lines 80 at approximately a 45° angle are fold lines 21a which terminate at the outer edge of each glue tab panel 18. Upon assembly of the litter box as shown in FIGS. 3 and 5, scoring 21a is overlapped by the lower portion of scoring 21 on the end panels 16, respectively. Scoring 21a on side panel 20 allows for the closure and reclosure of the litter box as shown in FIGS. 1, 2, 6 and 7.

Scoring 9 radiates in an approximately 90° angle V-shaped wedge from the distal end of fold lines 80, said scoring 9 encompasses a slot 5a and defines the foldable portion 22 of side panel 20. Upon assembly of the litter box as shown in FIGS. 2, 3 and 5, the foldable portion 22 of the side panel 20 and adjacent end panel 16 may be pushed inwardly along force arrows F as shown in FIG. 2 to lock the top closure panels 16, 17, 20, thereby maintaining the open erect position of the litter box.

Side panel 17 opposes side panel 20 and is a mirror image of side panel 20 as described above except for scoring 9, foldable portions 22 and slots 5a and as described hereinafter. Instead, side panel 17 extends distally from the receptacle section past the glue tab section 18 and has bevelled tabs 5 facing outwardly on either free longitudinal edge as shown in FIG. 4. This distal extension of panel 17 functions as a pilot portion for side panel 17 as described below. All functions of side panel 17 are analogous to side panel 20 as described above except for the foldable portions 22 feature of side panel 20 and the pilot portion of side panel 17 and as described below.

Figure 6:
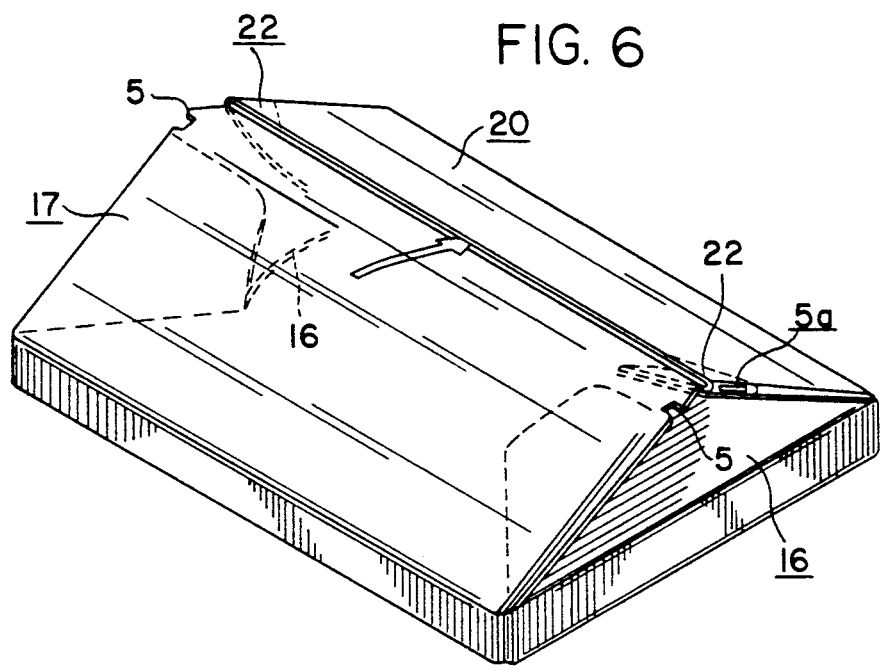
FIG. 6 is a perspective view of the litter box showing the nesting of the top closure side panels to place the box in a locked, closed position.
Figure 7:
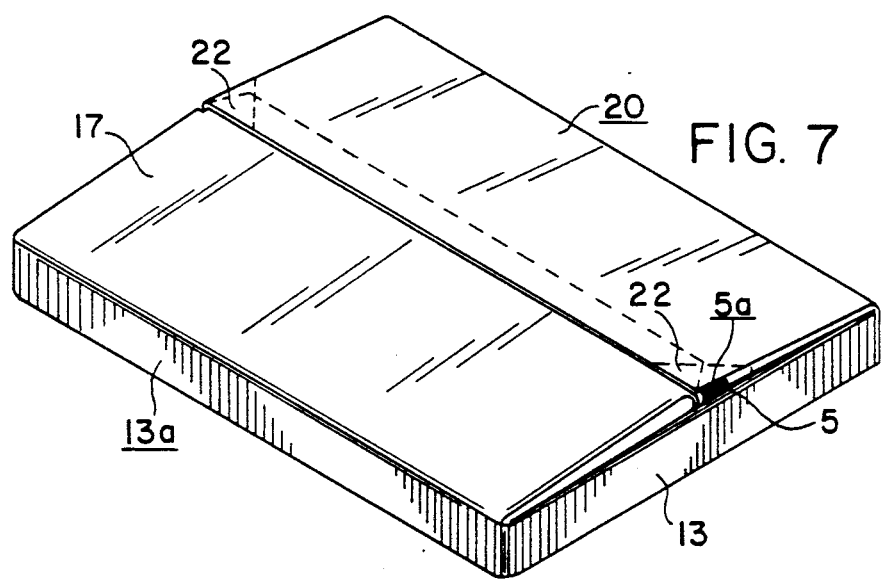
FIG. 7 shows the litter box fully closed and locked.
Figure 8:
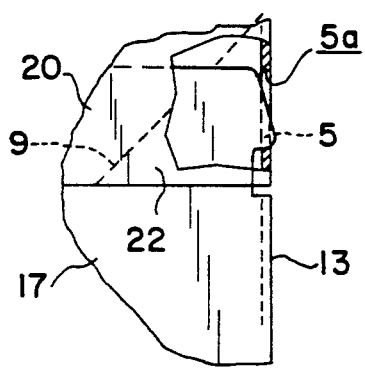
FIG. 8 is an enlarged fragmentary sectional view of the portion shown in the dot and dash circle of FIG. 7.

When the used litter box is to be disposed of, the locked, upright closure section is manipulated as hereinafter described. The foldable portions 22 are pushed outwardly in a direction opposite to that required to lock the foldable portions 22 as shown in FIGS. 2 and 3, thus allowing the end panels 16 and side panels 17, 20 to be folded to the closed, disposal position. The end panels 16 are pressed in near the scoring a and also near the central position of the side panel 16 so that the litter box collapses in a manner consistent with the initial opening of the litter box for use as shown in FIG. 2, with the side panels 17, 20 overlapping the end panels 16 as shown in FIG. 6. The pilot portion guides side panel 17, and tabs 5 of side panel 17 are inserted into the fold of side panel 20 caused by the foldable portions 22 until tabs 5 mate with slots 5a in side panel 20 as shown in FIGS. 7 and 8. The litter box is locked in the closed, disposable position and preventing any spilling of the contaminated particulate matter 30, such as kitty litter, from the collapsed, or closed, and locked litter box.

Considering now assembly and use of the litter box in accordance with the present invention. The box as previously described in detail in FIG. 4 is easy to assemble by simply pivoting the panels 16, 17 and 20 and walls 13a, 13 pivotally connected around the periphery of the base 11 upwardly and folding the glue tab panels 18 inwardly. The end panels 16 are then folded upwardly as shown in FIG. 5 to secure the end walls 13 and end panels 16 to the glue tab panels 18 in the manner shown. Thereafter, a quantity of litter 30 is placed in the container and the litter box is ready to seal. Initially the pilot portion of side panel 17 overlies the upper face of companion side panel 20 to seal the contents of the litter box as shown in FIG. 1. When the contents 30 are sealed, it is ready for display at retail stores. When it is desired to use the litter box, the purchaser simply breaks the adhesive seal along the front panel tab and raises the side 17, 20 and end panels 16 of the closure section to the open positioned shown in FIG. 2. The foldable portions 22 of the side panel 20 and adjacent end panels 16 are pressed inwardly simply by inserting the thumb at the crease of the foldable portions 22 as shown by arrow F in FIG. 2 and FIG. 3 to lock the panels 16, 17, 20 in an open erect position. After the contents 30 of the litter box have been spent and it is desired to dispose of them, the receptacle section is now closed in the manner shown in FIG. 6 wherein the pilot portion of side panel 17 nests in the pockets formed in the opposing side panel 20. Tabs 5 automatically align with slots 5a to secure the panels in a closed, ready to dispose of position as shown in FIGS. 7 and 8.

While particular embodiments of the present invention have been illustrated and described herein, it is not intended to limit the invention and changes and modifications may be made therein within the scope of the following claims.

What is claimed is:

1. A disposable device for use as a litter box, comprising:

a blank made of disposable flat material scored and cut in a predetermined pattern to form a receptacle section having a generally rectangular base and upstanding opposing side walls and opposing end walls;

a top closure section including at least two opposing end panels pivotally connected to the opposing end walls of said base and opposing side panels pivotally connected to opposing sidewalls of said base, said end panels and side panels connected along a juncture and, actuatable between a closed position overlying the base and an upright open position wherein the side and end panels are upright permitting access to the receptacle section; and collapsible corner means at the juncture of the side and end panels operable to pivot inwardly to maintain and lock the side and end panels in the upright open position.

2. The device claimed in claim 1 wherein said collapsible corner means comprises straight line scoring provided on adjacent end and side panel extending from an upper edge of each panel downwardly to a point where they converge at the juncture of the end panel and side panel at a point spaced upwardly from the pivotal connection of said side and end panels to said side and end walls, defining two triangularly shaped, bendable sections which fold inwardly to lock the side and end panels in an open position.

3. The device as claimed in claim 1 wherein said side panels and end panels are connected to one another and are configured so that one side panel, when folded inwardly, forms end pockets with the end panels for receiving the free outer longitudinal edge of said side panel which includes at least two tabs, and means defining slotted openings in each pocket thus formed in a fold line connecting the one side panel and end panels and locking means comprising the tabs on the other said side panels engageable in the slotted opening to lock the side panels in the fully collapsed, or closed, position of the side panels and end panels.

4. The device as claimed in claim 1 wherein the tabs are bevelled to function as a pilot portion when reclosing the panels to the fully collapsed or closed and locked position.

5. The device as claimed in claim 1 including arcuate cutouts in the end panels to provide easy access to the receptacle section when the side panels and end panels are in an erect position.

* * * * *